(12) United States Patent
Zhu et al.

(10) Patent No.: US 8,842,828 B2
(45) Date of Patent: Sep. 23, 2014

(54) SYSTEM AND METHOD FOR HYBRID MULTIPLE SOURCE DECRYPTION

(75) Inventors: Yi Zhu, San Jose, CA (US); Anand Rajagopalan, Saratoga, CA (US); Matthew Daniel Smith, San Jose, CA (US); Vinod Nagarajan, Saratoga, CA (US)

(73) Assignee: Qualcomm Incorporated, San Diego, CA (US)

( * ) Notice: Subject to any disclaimer, the term of this patent is extended or adjusted under 35 U.S.C. 154(b) by 119 days.

(21) Appl. No.: 13/563,977

(22) Filed: Aug. 1, 2012

(65) Prior Publication Data
US 2014/0037091 A1 Feb. 6, 2014

(51) Int. Cl.
*H04L 29/06* (2006.01)
(52) U.S. Cl.
USPC .......................................................... 380/255
(58) Field of Classification Search
USPC .......................................................... 380/255
See application file for complete search history.

(56) References Cited

U.S. PATENT DOCUMENTS

| | | | |
|---|---|---|---|
| 5,805,705 A | 9/1998 | Gray et al. | |
| 7,627,747 B2 | 12/2009 | Eckhardt et al. | |
| 2001/0044897 A1* | 11/2001 | Ishiguro et al. | 713/171 |
| 2002/0087874 A1* | 7/2002 | Lippincott | 713/194 |
| 2005/0060542 A1* | 3/2005 | Risan et al. | 713/165 |
| 2005/0195813 A1 | 9/2005 | Ambe et al. | |
| 2006/0112284 A1* | 5/2006 | Kato et al. | 713/193 |
| 2007/0030964 A1 | 2/2007 | Soda | |
| 2007/0081673 A1 | 4/2007 | Ren | |
| 2007/0258582 A1* | 11/2007 | Elder et al. | 380/29 |
| 2008/0235722 A1* | 9/2008 | Baugher et al. | 725/32 |
| 2009/0019539 A1* | 1/2009 | Jonnalagadda et al. | 726/14 |
| 2010/0153705 A1 | 6/2010 | Senga et al. | |

FOREIGN PATENT DOCUMENTS

| | | |
|---|---|---|
| EP | 1054546 A2 | 11/2000 |
| WO | WO2007059558 A1 | 5/2007 |

OTHER PUBLICATIONS

International Search Report and Written Opinion—PCT/US2013/052565—ISA/EPO—Oct. 30, 2013.

* cited by examiner

*Primary Examiner* — Michael S McNally
(74) *Attorney, Agent, or Firm* — Bay Area Technology Law Group P.C.

(57) ABSTRACT

Systems and methods are disclosed to improve performance of a communications device receiving encrypted communications from multiple sources. The communications device is configured to increase the amount of decryption performed using a hardware-based process as compared to a software-based process by reprogramming the hardware to store a shared security key corresponding to a frame received from a source, allowing the hardware-based process to decrypt subsequent frames from that source.

18 Claims, 4 Drawing Sheets

SYSTEM AND METHOD FOR HYBRID MULTIPLE SOURCE DECRYPTION

FIELD OF THE PRESENT INVENTION

This disclosure generally relates to encrypted communication systems and more specifically to systems and methods for facilitating performance of a device receiving encrypted communications from multiple sources using hybrid hardware and software based implementations.

BACKGROUND OF THE INVENTION

Shared key encryption is a popular and effective method for securing communications between two parties. In such systems, a cryptographically unique "key" is used by both parties to encrypt and decrypt the data being communicated between them. In a packet-based communication, this may involve a transmitter encrypting each frame with the security key prior to sending the frame to the receiver. A common contemporary example is an IEEE 802.11-based wireless local area network (WLAN) operating under a security protocol such as Wi-Fi protected access II (WPA2.) For example, an access point (AP) may maintain an individual security key for each session with each station (STA) in its basic service set (BSS.) Likewise, a STA may be associated with more than one BSS, requiring the STA to maintain an individual security key for each session with each AP. Although the situation may exist in any form of communication whether wired or wireless, particularly in the wireless context a communications device may receive multiple streams of encrypted information concurrently, with each stream requiring an individual security key to properly decrypt.

Under conventional implementations, a communications device may not have access to advance knowledge regarding which security key to apply without involvement of upper logical layers of the device's receiver. However, it may also be desirable to minimize the involvement of the upper logical layers during decryption in order to improve performance. As will be appreciated, a decryption module implemented in hardware in one of the lower logical layers of the communications device, such as the media access control (MAC) layer may provide considerable advantages in efficiency in comparison to a decryption process implemented in the software of the upper logical layers. For example, a hardware based decryption module may consume less power while still operating more quickly. However, as discussed above, the communications device may not be configured to resolve the source of each stream of encrypted information in the lower logical layers.

As a result, the communications device may be configured to maintain a single security key in a hardware-based decryption module, allowing the hardware to correctly decrypt information from the single source associated with that security key in an efficient manner. Encrypted information from other sources may not be decrypted correctly by the hardware, requiring that the communications device be configured to decrypt information from other sources using a software based decryption module implemented in one or more of the upper logical layers of the communications device. Although the software may have sufficient flexibility to correctly decrypt steams of information from multiple sources, performance suffers as compared to hardware-based decryption. If the processor operating the software based decryption module is not very powerful or is subject to competing demands, it may not be possible to decrypt the communications at acceptable speeds.

In view of such conditions, it would be desirable to provide a communications device that offers improved decryption of information streams from multiple sources. Further, it would be desirable to provide a communications device that increases the amount of decryption performed using a hardware based module as compared to the amount performed using a software based module. This invention accomplishes these and other goals.

SUMMARY OF THE INVENTION

In accordance with the above needs and those that will be mentioned and will become apparent below, this specification discloses a communications device for receiving encrypted frames from a plurality of sources, wherein each source has an individual security key, including a hardware portion having a stored security key for decrypting incoming frames, and a software portion for decrypting incoming frames, wherein the hardware portion is configured to process incoming frames using the stored security key and wherein the software portion is configured to determine a correct security key for an incoming first frame from a first source when the stored security key is a first security key and processing of the first frame by the hardware portion results in an integrity error, and reprogram the hardware portion to store a second security key corresponding to the correct security key determined by the software portion for the first frame.

A further aspect of the disclosure is that the software portion may also encrypt the first frame with the first security key after the frame has been processed by the hardware portion and subsequently decrypt the first frame with the second security key. In addition, the software portion may be configured to decrypt an incoming second frame, received subsequent to the first frame, with the second security key and maintain the second security key as the stored security key of the hardware portion when processing of the second frame by the hardware portion does not result in an integrity error but does result in a key miss error.

In one embodiment, the hardware portion may be further configured to process an incoming second frame, received subsequent to the first frame, wherein the communications device is configured to determine the second frame has been correctly decrypted by the hardware portion when the stored security key is the second security key and processing the second frame with the hardware portion does not result in an integrity error or a key miss error. Further, the software portion may be configured to determine a correct security key for an incoming third frame from a second source when the stored security key is the second security key and processing of the third frame by the hardware portion results in an integrity error and reprogram the hardware portion to store a second security key corresponding to the correct security key determined by the software portion for the third frame.

Some embodiments of the disclosure are directed to a communications device comprising a node in a WLAN employing a WPA-based cryptographic protocol. In such embodiments, the security keys may be pairwise transient keys (PTKs). Further, the communications device may include a host CPU coupled to a WLAN module by an interface, wherein the hardware portion is implemented in the WLAN module and wherein the software portion is implemented in the host CPU. Further, the hardware portion may be implemented at a media access control layer of the WLAN module.

This disclosure is also directed to a method for decrypting information received by a communications device from a plurality of sources, wherein each source has an individual security key, including the steps of performing a hardware-based decryption process on a first incoming frame received from a first source using a stored security key, receiving an integrity error when processing the first frame when the stored security key is a first security key, performing a software-based determination of the correct security key for the first frame, and reprogramming the stored security key from the first security key to the second security key, wherein the second security key corresponds to the correct security key determined for the first frame.

Further, the method may include performing a software-based encryption process on the first frame using the first security key after performing the hardware-based decryption process and performing a software-based decryption process on the first frame using the second security key. In addition, a hardware-based decryption process may be performed on an incoming second frame, received subsequent to the first frame, a key miss error, but not an integrity error, may be received, a software-based decryption process may be performed on the second frame with the second security key, and the second security key may be maintained as the stored security key.

Another aspect includes the steps of performing a hardware-based decryption process on an incoming second frame, received subsequent to the first frame when the stored security key is the second security key and determining the second frame has been correctly decrypted by the hardware-based decryption process when no integrity error or a key miss error is received. In addition, the noted method may also include performing a hardware-based decryption process on a third incoming frame received from a second source using the stored security key, receiving an integrity error when processing the first frame when the stored security key is a first security key, performing a software-based determination of the correct security key for the third frame, and reprogramming the stored security key from the second security key to a third security key, wherein the third security key corresponds to the correct security key determined for the third frame.

In one embodiment, the method may be performed using a communications device that may be a node in a WLAN employing a WPA-based cryptographic protocol. In such embodiments, the security keys may be pairwise transient keys (PTKs). Further, the communications device may include a host CPU coupled to a WLAN module by an interface, wherein the hardware-based decryption process is performed by the WLAN module and wherein the software-based decryption process is performed in the host CPU. Preferably, the hardware-based decryption process may be performed in a media access control layer of the WLAN module.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

Figure 1:
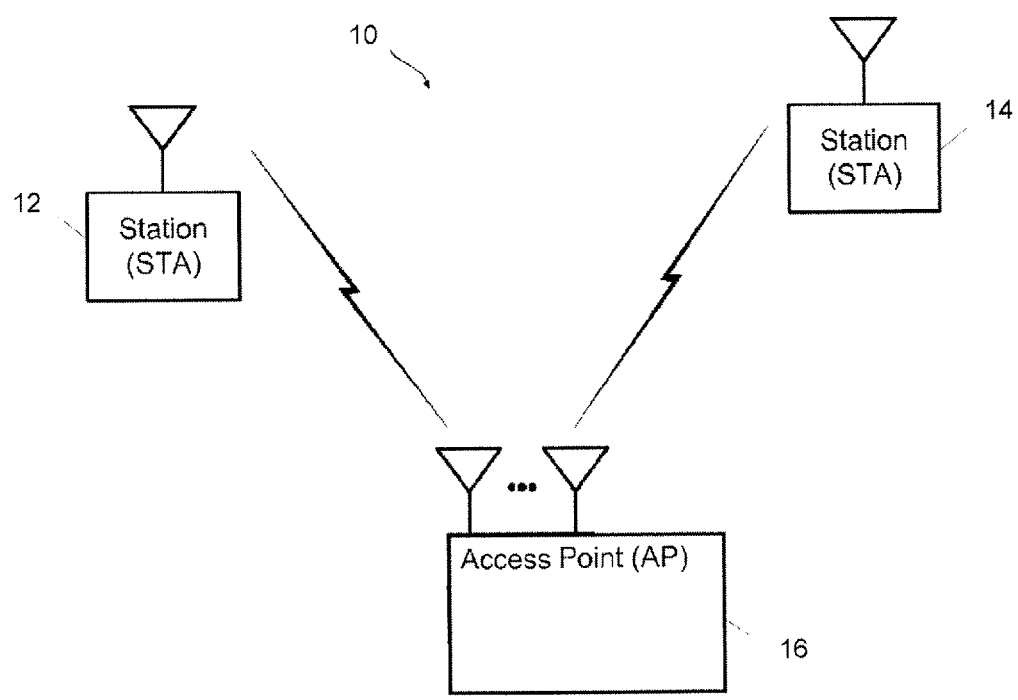
FIG. 1 depicts a wireless communication system, according to one embodiment of the invention.

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), and flash memory or any other medium that can be used to store the desired information.

Further, embodiments are discussed in specific reference to wireless networks. As such, this disclosure is applicable to any suitable wireless communication systems having the necessary characteristics. Although discussed in specific reference to an infrastructure WLAN featuring at least an AP and an associated STA, the techniques of this disclosure may be applied to other wireless communication systems or to other network configurations, including ad hoc and STA-to-STA networks, involving a transmitter device and a receiver device. Accordingly, as used herein, the term "station" may mean any node in a wireless communications network having a role equivalent to a conventional station in an 802.11 infrastructure network and likewise, the term "access point" may mean any node having a role equivalent to a conventional access point. Further, these techniques may also be extended to any type of communication system employing shared key cryptography having the requisite characteristics, including wired communication systems.

In the figures, a single block may be described as performing a function or functions; however, in actual practice, the function or functions performed by that block may be performed in a single component or across multiple components, and/or may be performed using hardware, using software, or using a combination of hardware and software. Also, the exemplary wireless network devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a tangible computer-readable storage medium comprising instructions that, when executed, performs one or more of the methods described above. The tangible computer-readable data storage medium may form part of a computer program product, which may include packaging materials.

The tangible computer-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the invention in any manner and may change depending upon context. Further, sequential terms such as first and second may be used to distinguish similar elements, but may be used in other orders or may change also depending upon context.

Unless defined otherwise, all technical and scientific terms used herein have the same meaning as commonly understood by one having ordinary skill in the art to which the disclosure pertains.

Further, all publications, patents and patent applications cited herein, whether supra or infra, are hereby incorporated by reference in their entirety.

Finally, as used in this specification and the appended claims, the singular forms "a, "an" and "the" include plural referents unless the content clearly dictates otherwise.

As noted above, a wide variety of communications devices may be configured to employ a shared key encryption system. In particular, wireless devices communicating using an IEEE 802.11 standard can be secured with encryption using WPA/WPA2 protocols. FIG. 1 is a schematic illustration of a WLAN environment 10 including STA 12 and STA 14, such that each station is associated with AP 16. In order to properly encrypt and decrypt information being sent between AP 16 and STAs 12 and 14, an individual security key may be used for each connection, such that a first security key may be used for communications between STA 12 and AP 16 and a second security key for communications between STA 14 and AP 16. Details regarding the decryption of incoming packets received by AP 16 from STA 12 and STA 14 are discussed in the sections below.

Under the WPA2 protocol, packets are encrypted and decrypted using a security key for each packet. This pairwise transient key (PTK) is generated from a pairwise master key (PMK) established for each separate communications link and attributes specific to each device participating in the communication. As the name indicates, the PTK has a limited lifetime and is generated as necessary by the respective parties to the encrypted communication. Once a security authentication has occurred, the temporary keys are created for each session and regularly updated as long as the secure communication link remains active.

Figure 2:
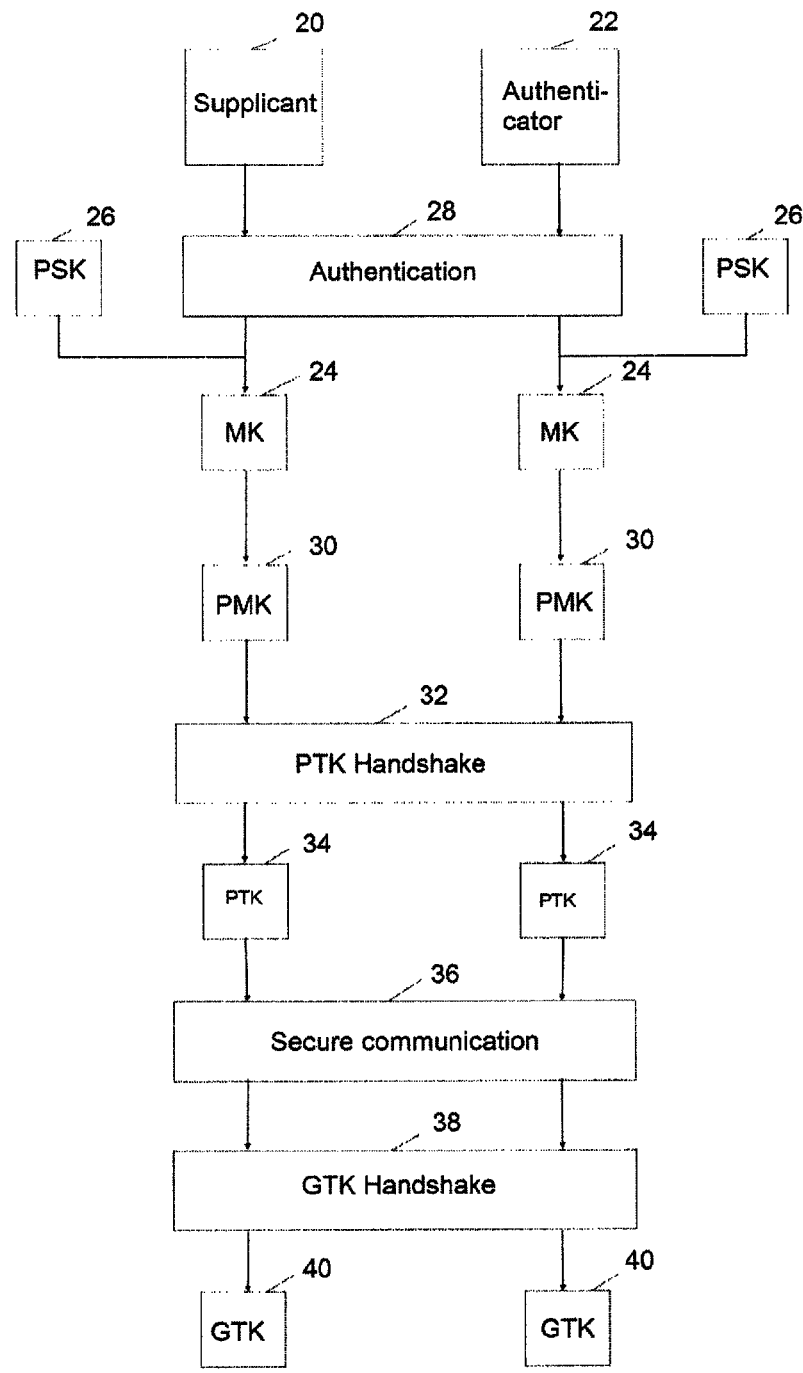
FIG. 2 depicts the hierarchy of security keys used with a WPA2 protocol and the processes used to generate them.

As schematically diagrammed in FIG. 2, supplicant 20 and authenticator 22 may establish a master key (MK) 24. Some embodiments of WPA2 employ a pre-shared key (PSK) 26, in which PSK 26 is derived from a passphrase or a bit-string that is shared between the parties. In other embodiments, a master key (MK) 24 is established between the parties in the course of the authentication process 28, either locally by authenticator 22 or via a remote authentication server such as a Remote Authentication Dial-In User Service (RADIUS.) In the context of WLAN environment 10 described above, supplicant 20 may be STA 12 or STA 14 and authenticator 22 may be AP 16. Both supplicant 20 and authenticator 22 (or a suitable remote server, as described above) determine MK 24 as described. Next, supplicant 20 and authenticator 22 independently derive PMK 30 from MK 24 using a symmetric process so that the same PMK is generated by each party. PMK 30 may then be used in handshake exchange 32 during which supplicant 20 and authenticator 22 generate PTK 34. As described above, the PTK 34 may be a session-based security key used for the encryption and decryption of information exchanged in the form of secured communication 36 between supplicant 20 and authenticator 22.

Under this hierarchy, PMK 30 may not be used for encrypting or decrypting information. As will be appreciated, this configuration provides a layer of cryptographic insulation between MK 24 and PTK 34, minimizing the exposure of PMK 30 and making unauthorized access to the secured information more difficult. In a further aspect, information from PTK 34 may be used in handshake exchange 38 to generate group transient keys (GTK) 40. GTK 40 may be used in a similar manner to as PTK 34, except that GTK 40 may be used for multicast traffic while PTK 34 may be used for unicast traffic. As described below, the session-based security keys PTK 34 and GTK 40 may be used by either a hardware-based decryption module or a software-based decryption module to recover information received by authenticator 22 from supplicant 20.

Handshake exchanges 32 and 38 may comprise a four-way handshake in order to properly authenticate authenticator 22 to supplicant 20 and generate the transient keys as described. In one aspect, during PTK handshake exchange 32, authenticator 22 sends a first nonce, such as APNonce, to supplicant 20. Supplicant 20 returns a second nonce, such as SNonce, to authenticator 22. Supplicant 20 and authenticator 22 may then independently generate PTK by concatenating, for example, PMK 30, APNonce, SNonce and the MAC addresses of supplicant 20 and authenticator 22. Once PTK 34 is generated, of supplicant 20 and authenticator 22 may further generate GTK 40 from aspects of PTK 34. Then, GTK handshake exchange 38 may be conducted in which authenticator 22 sends GTK 40 to supplicant 20, which responds with an acknowledgement if the GTKs match.

Although discussed in the context of an 802.11 WLAN employing WPA2, one of skill in the art will recognize that the techniques of this disclosure may be extended to any suitable form of communication system having an encryption system using a shared key having characteristics and functionality corresponding generally to PTK 34.

Figure 3:
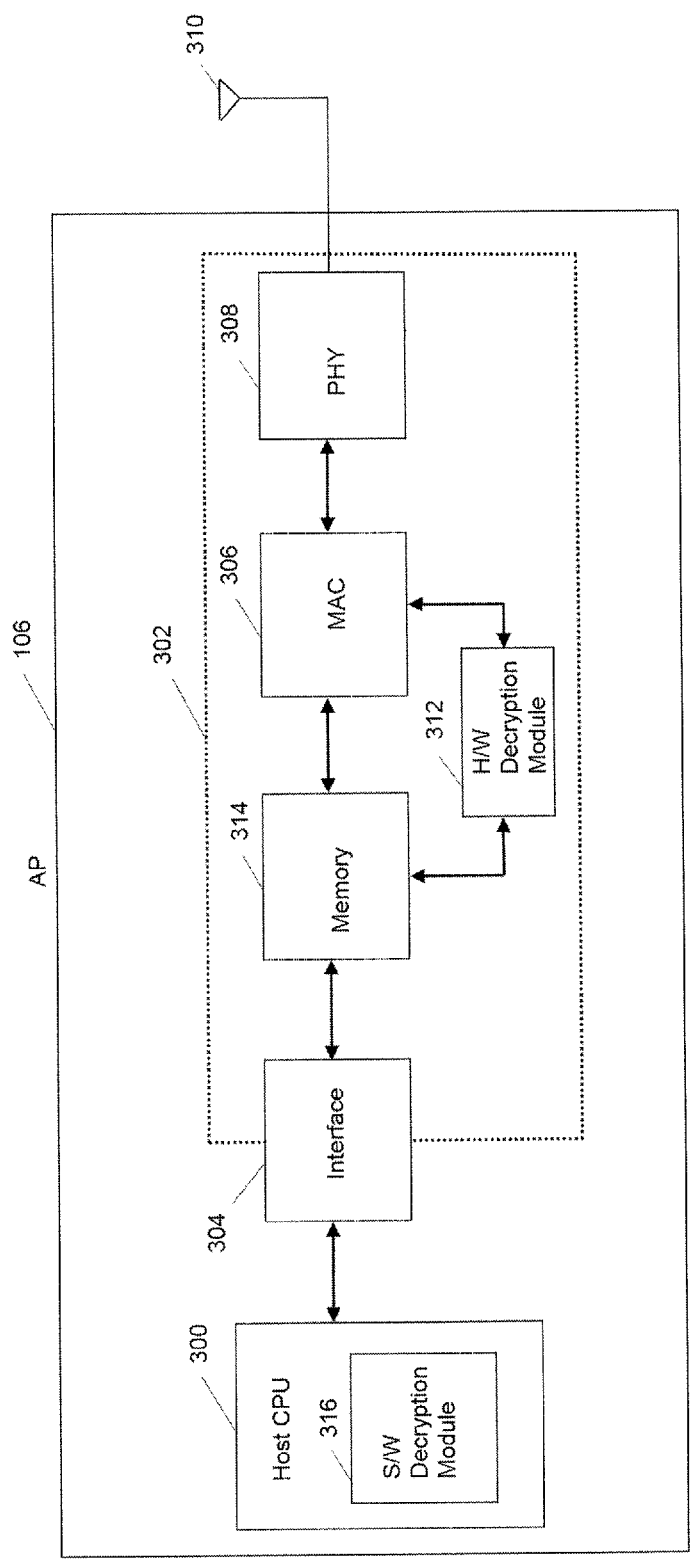
FIG. 3 schematically depicts functional blocks of a WLAN device, according to one embodiment of the invention.

Decryption of information may be achieved using either a hardware-based technique, a software-based technique, or a combination of both. An embodiment of a communication device according to the techniques of this specification is shown in FIG. 3 in the context of AP 16 that is configured to increase the amount of information from multiple sources including STA 12 and STA 14 that is decrypted in hardware as compared to software. In particular, AP 16 as shown includes host CPU 300 capable of performing various computations associated with the operation of the communications device. As will be appreciated, the capabilities and configuration of host CPU 300 may vary widely depending upon the application and the functionality of the communications device. Host CPU 300 is coupled to WLAN module 302 through bus interface 304.

In turn, WLAN module 302 generally includes a media access controller (MAC) 306 that may be configured to manage communications between the host CPU 300 and other network nodes over the wireless medium and therefore may include functionalities for the handling and processing frames including verification, acknowledgment, routing, formatting and the like. Incoming and outgoing frames are exchanged between MAC 306 and physical layer (PHY) 308, which as shown here includes the functions of modulating the frames according to the relevant 802.11 protocol as well as providing the analog processing and RF conversion necessary to provide transmission and reception of wireless signals over antenna 310.

Of particular relevance to this disclosure, WLAN module 302 may include hardware based (H/W) decryption module 312 associated with MAC 306 to provide decryption of incoming frames of information received over the wireless medium. Preferably, H/W decryption module 312 may be a dedicated hardware circuit configured to perform the necessary cryptographic algorithms without executing software-implemented instructions. According to embodiments of this disclosure, H/W decryption module 312 may be configured to store a security key such as PTK 34 or GTK 40 for use in performing the decryption algorithms. Furthermore, embodiments of the disclosure involve reprogramming H/W decryption module 312 to store different security keys and may preferably employ ASIP, FPGA, or equivalent circuitry. Such implementations offer significant efficiencies in the decryption of received information.

MAC 306 and H/W decryption module 312 communicate with memory block 314, which may include one or more buffers for storing decrypted and encrypted frames. For example, incoming encrypted frames may be stored in a first queue which is accessed by H/W decryption module 308 to perform the decryption process. Likewise, the decrypted frames output by H/W decryption module 308 may be stored in a second queue, which may then be accessed by host CPU 300. In the embodiment shown, memory block 314 is depicted as a separate component within WLAN module 302. However, this configuration is shown to clarify the relationship between the depicted functional blocks and one of skill in the art will recognize that memory block 314 may be implemented in any suitable manner. Preferably, memory block 314 may be a portion of a centralized storage accessed by MAC 306 and host CPU 300 over interface 304, such as in a direct memory access (DMA) configuration. Furthermore, MAC 306 and H/W decryption module 312 are described with reference to the decryption of incoming frames to more clearly convey the concepts of this disclosure, but it should be recognized that communications devices such as AP 16 will typically be configured to provide encryption of frames as well.

As discussed above, H/W decryption module 312 stores a security key corresponding to a communications session established with another network node, such as STA 12 or STA 14. Incoming frames from the STA corresponding to the stored security key are properly decrypted by H/W decryption module 312, but incoming frames from other sources, such as the other STA, will not decrypt properly because the stored security key does not match the key used to encrypt the frames. In these circumstances, H/W decryption module 312 will generate an error indicating improper decryption and may store the frame in memory block 314. Subsequently, host CPU 300 may retrieve the frame from memory block 314 and properly decrypt the frame using S/W decryption module 316, preferably implemented as instructions performed by host CPU 300.

Thus, decryption of frames with S/W decryption module 316 involve the use of host CPU 300 and share its resources with other tasks performed by the communications device, while decryption of frames with H/W decryption module 312 may employ specific circuitry dedicated to the cryptographic processes. Correspondingly, decryption with H/W decryption module 312 may be considerably more efficient than S/W decryption module 316 such that techniques of this disclosure are directed to systems and methods for increasing the amount of decryption performed by H/W decryption module 312 as compared to S/W decryption module 316.

These techniques may be particularly applicable when, depending upon the design, host CPU 300 may not have the performance necessary to meet an acceptable standard when employing software decryption. For example, devices configured for use with the 802.11n standard should preferably accommodate two-stream data rates of 300 Mbps and three-stream rates of 450 Mbps. Particularly in embedded systems, the communications device may not have sufficient computing power to maintain such data rates using software decryption. Accordingly, by increasing the amount of decryption performed by H/W decryption module 312, improved performance may be achieved, even for embodiments in which H/W decryption module 312 may store only one security key at a time.

In one aspect, the techniques of this disclosure may be advantageously applied to WLAN communications. Since traffic over a WLAN may arrive in bursts, often several frames from a single source arrive in succession, which may then be followed by another sequence of frames that arrive from a different source. By reprogramming the security key stored by H/W decryption module 312 with the key corresponding to the current source, the amount of frames decrypted using H/W decryption module 312 may be increased. S/W decryption module 316 may be used to analyze an incoming encrypted frame to determine the appropriate security key. S/W decryption module 316 then reprograms H/W decryption module 312 with the determined security key so that subsequent incoming encrypted frames may be correctly decrypted with H/W decryption module 312.

Figure 4:
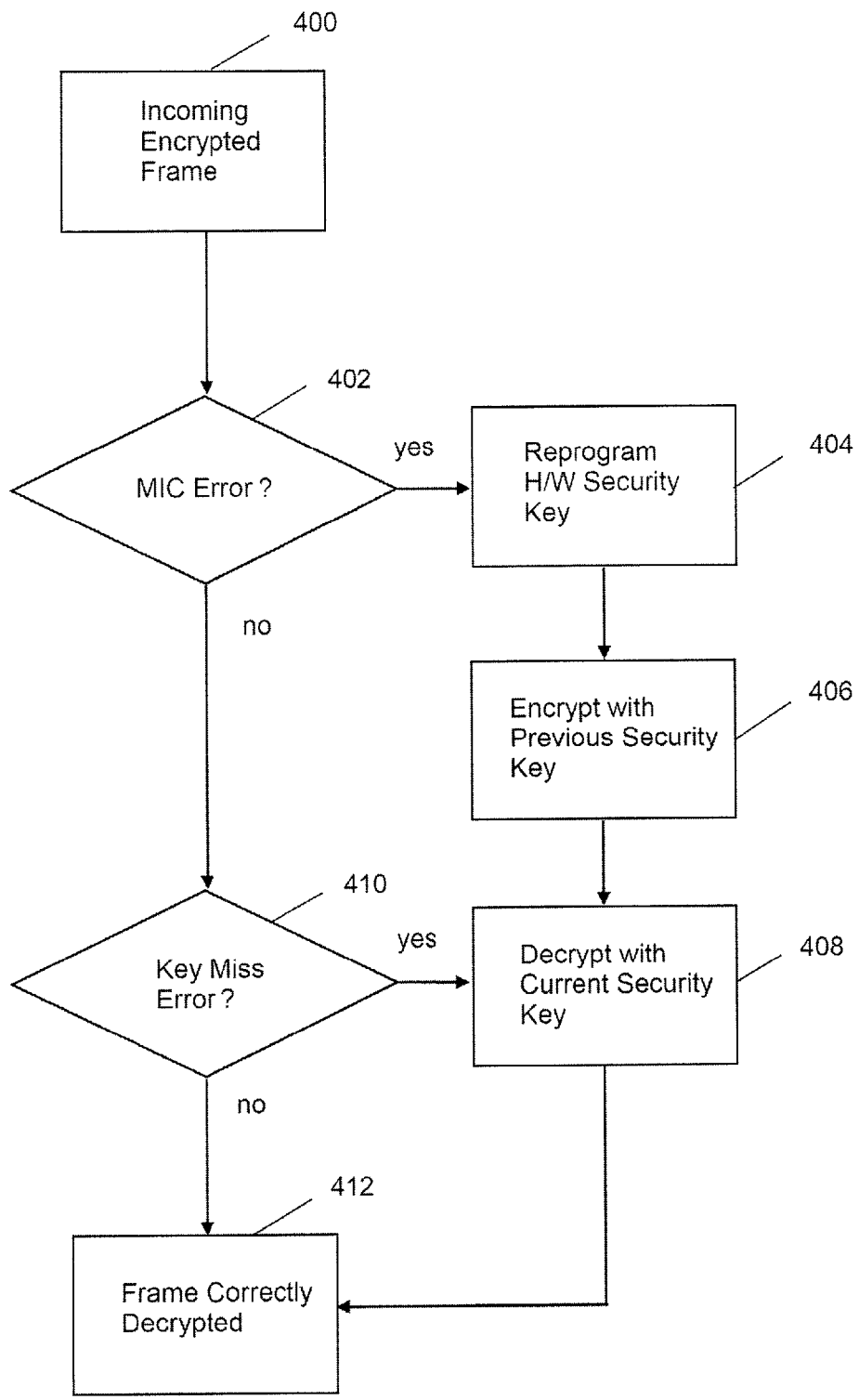
FIG. 4 depicts a flowchart showing a routine for reprogramming the hardware portion of a WLAN device to decrypt frames received from multiple sources, according to one embodiment of the invention.

An exemplary routine for reprogramming the stored security key of H/W decryption module 312 is shown in FIG. 4, and is discussed in the context of WLAN environment 10. Beginning with step 400, an incoming encrypted frame sent by STA 12 is received by MAC 306 from PHY 308. The frame may be routed directly to H/W decryption module 312 or may be stored in a queue in memory block 314, depending upon the configuration of WLAN module 302. H/W decryption module 312 then processes the frame and attempts to decrypt it using the currently stored security key.

Depending upon the cryptography scheme employed by the communications device, various mechanisms may be employed to determine the successful completion of aspects of the decryption process. For example, under WPA2, a message integrity code (MIC) may be included with the encrypted frames to authenticate and verify the information contained in the frame. If the currently stored security key, such as PTK 34, does not match the security key used by STA 12 to encrypt the frame, the decryption process performed by H/W decryption module 312 will not correctly decrypt the frame. Thus, step 402 determines whether processing of the frame results in a MEC error. When a MIC error is returned, MAC 306 may be configured to pass the incorrectly decrypted frame to host CPU 300 for processing by S/W decryption module 316. S/W decryption module 316 determines PTK 34 corresponding to the session with STA 12 should be used and reprograms H/W decryption module 312 to store the PTK corresponding to STA 12 in step 404. Next, since the frame was incorrectly decrypted, S/W decryption module 316 re-encrypts the frame using the PTK previously stored in H/W decryption module 312. Preferably, the cryptographic process is symmetric so that the re-encrypted frame is returned to the original state by step 406. S/W decryption module 316 then may apply the correct PTK that corresponds to STA 12 to correctly decrypt the frame in step 408 to lead to the end result of the routine in step 412 being that the frame is properly decrypted.

The routine may then be repeated for additional incoming frames. Correspondingly, when a subsequent encrypted frame sent by STA 12 is received, H/W decryption module 312 now applies the PTK stored during the previous iteration of the routine, i.e., the PTK corresponding to STA 12, when processing the frame. As a result, processing of the frame in step 402 does not return a MIC error, so the routine now branches to step 410 to analyze the frame's descriptors to determine whether a key miss error occurred. If a key miss error is returned, the routine moves to step 408 so that S/W decryption module 316 decrypts the frame using the PTK corresponding to STA 12. Since a key miss error indicates that decryption was not performed when H/W decryption module 312 processed the frame, the frame does not need to be re-encrypted. If no key miss error is returned in step 410, the routine may determine the frame was correctly decrypted when processed by H/W decryption module 312 and terminate at step 412.

Thus, after the processing of a first frame by H/W decryption module 312 using an incorrect PTK, the routine of FIG. 4 reprograms H/W decryption module 312 to store the correct PTK so that subsequent incoming frames from the same source may be decrypted using H/W decryption module 312. When another sequence of frames arrives from a different source, S/W decryption module 316 may then decrypt the initial frame or frames and again reprogram H/W decryption module 312 to the PTK of the new source. After this next iteration of reprogramming, H/W decryption module 312 may be used to decrypt the frames from the different source.

As noted, the routine accommodates circumstances in which a MIC error is not generated by step 402 but a key miss error is in step 410. This pattern of errors may be taken as an indication that S/W decryption module 316 has already initiated the reprogramming of H/W decryption module 312, so the routine does not repeat that step.

From the discussion above, it may be seen that the benefits derived from the hybrid software and hardware implementations of the disclosure are optimized when multiple, sequential frames are received from the same source. As such, this approach is particularly suitable for standards that involve the use aggregated subframes. In one aspect, under 802.11n protocols, an aggregated MAC protocol data unit (A-MDPU) may include up to 64 subframes. As an example, with an average aggregation frame of 16 subframes, only the initial one or two frames may be decoded by S/W decryption module 316, depending upon the speed at which H/W decryption module 312 may be reprogrammed. Accordingly, the remaining aggregated subframes may be decoded by H/W decryption module 312, representing a potential reduction in the load on host CPU 300 of the communications device of approximately 75% to 87.5%.

Further, since the benefits of these techniques may be related to the number of frames received in sequence from a single source, it may be desirable to selectively implement the hybrid hardware and software approach based upon characteristics of the traffic. In one embodiment, a statistical analysis of past traffic patterns may be used to identify circumstances that are more likely to benefit from the technique. Alternatively, other suitable criteria may be used to determine when the communications device may be beneficially operated using the systems and methods of this disclosure.

Described herein are presently preferred embodiments. However, one skilled in the art that pertains to the present invention will understand that the principles of this disclosure can be extended easily with appropriate modifications to other applications.

What is claimed is:

1. A communications device for receiving encrypted frames from a plurality of sources, wherein each source has an individual security key, comprising:

a hardware portion having a stored security key for decrypting incoming frames; and a software portion for decrypting incoming frames, wherein the hardware portion is configured to process incoming frames using the stored security key and wherein the software portion is configured to:

determine a correct security key for an incoming first frame from a first source when the stored security key is a first security key and processing of the first frame by the hardware portion results in an integrity error, and reprogram the hardware portion to store a second security key corresponding to the correct security key determined by the software portion for the first frame.

2. The communications device of claim 1, wherein the software portion is further configured to:

encrypt the first frame with the first security key after the first frame has been processed by the hardware portion, and subsequently decrypt the first frame with the second security key.

3. The communications device of claim 2, wherein the software portion is further configured to:

decrypt an incoming second frame, received subsequent to the first frame, with the second security key, and maintain the second security key as the stored security key of the hardware portion when processing of the second frame by the hardware portion does not result in an integrity error but does result in a key miss error.

4. The communications device of claim 2, wherein the hardware portion is further configured to process an incoming second frame, received subsequent to the first frame, wherein the communications device is configured to determine the second frame has been correctly decrypted by the hardware portion when the stored security key is the second security key and processing the second frame with the hardware portion does not result in an integrity error or a key miss error.

5. The communications device of claim 4, wherein the software portion is further configured to:

determine a correct security key for an incoming third frame from a second source when the stored security key is the second security key and processing of the third frame by the hardware portion results in an integrity error, and reprogram the hardware portion to store a second security key corresponding to the correct security key determined by the software portion for the third frame.

6. The communications device of claim 1, wherein the communications device is a node in a WLAN employing a WPA-based cryptographic protocol.

7. The communications device of claim 6, wherein the security keys comprise pairwise transient keys (PTKs).

8. The communications device of claim 6, wherein the communications device comprises a host CPU coupled to a WLAN module by an interface, wherein the hardware portion is implemented in the WLAN module and wherein the software portion is implemented in the host CPU.

9. The communications device of claim 8, wherein the hardware portion is implemented at a media access control layer of the WLAN module.

10. A method for decrypting information received by a communications device from a plurality of sources, wherein each source has an individual security key, comprising:

performing a hardware-based decryption process on a first incoming frame received from a first source using a stored security key;

receiving an integrity error when processing the first frame when the stored security key is a first security key;

performing a software-based decryption process to determine a correct security key for the first frame; and reprogramming the stored security key from the first security key to a second security key, wherein the second security key corresponds to the correct security key determined for the first frame.

11. The method of claim 10, further comprising:

performing a software-based encryption process on the first frame using the first security key after performing the hardware-based decryption process; and performing a software-based decryption process on the first frame using the second security key.

12. The method of claim 11, further comprising:

performing a hardware-based decryption process on an incoming second frame, received subsequent to the first frame;

receiving a key miss error but not an integrity error;

performing a software-based decryption process on the second frame with the second security key; and maintaining the second security key as the stored security key.

13. The method of claim 11, further comprising:

performing a hardware-based decryption process on an incoming second frame, received subsequent to the first frame when the stored security key is the second security key; and determining the second frame has been correctly decrypted by the hardware-based decryption process when no integrity error or a key miss error is received.

14. The method of claim 13, further comprising:

performing a hardware-based decryption process on a third incoming frame received from a second source using the stored security key;

receiving an integrity error when processing the first frame when the stored security key is a first security key;

performing a software-based determination of the correct security key for the third frame; and reprogramming the stored security key from the second security key to a third security key, wherein the third security key corresponds to the correct security key determined for the third frame.

15. The method of claim 10, wherein the communications device is a node in a WLAN employing a WPA-based cryptographic protocol.

16. The method of claim 15, wherein the security keys comprise pairwise transient keys (PTKs).

17. The method of claim 15, wherein the communications device comprises a host CPU coupled to a WLAN module by an interface, wherein the hardware-based decryption process is performed by the WLAN module and wherein the software-based decryption process is performed in the host CPU.

18. The method of claim 17, wherein the hardware-based decryption process is performed in a media access control layer of the WLAN module.

* * * * *